(12) United States Patent
Venckus

(10) Patent No.: US 12,025,246 B2
(45) Date of Patent: Jul. 2, 2024

(54) VACUUM CHAMBER CONNECTOR

(71) Applicant: Thermo Fisher Scientific (Bremen) GmbH, Bremen (DE)

(72) Inventor: Aivaras Venckus, Bremen (DE)

(73) Assignee: Thermo Fisher Scientific (Bremen) GMBH, Bremen (DE)

( * ) Notice: Subject to any disclaimer, the term of this patent is extended or adjusted under 35 U.S.C. 154(b) by 0 days.

(21) Appl. No.: 17/931,726

(22) Filed: Sep. 13, 2022

(65) Prior Publication Data
US 2023/0078069 A1 Mar. 16, 2023

(30) Foreign Application Priority Data

Sep. 13, 2021 (GB) ...................................... 2113035

(51) Int. Cl.
| | | |
|---|---|---|
| *F16L 21/035* | (2006.01) | |
| *F16L 21/025* | (2006.01) | |
| *H01J 49/24* | (2006.01) | |

(52) U.S. Cl.
CPC ........... *F16L 21/035* (2013.01); *F16L 21/025* (2013.01); *H01J 49/24* (2013.01)

(58) Field of Classification Search
CPC ....... F16L 21/035; F16L 21/02; F16L 21/045; H01J 49/24
See application file for complete search history.

(56) References Cited

U.S. PATENT DOCUMENTS

| | | | |
|---|---|---|---|
| 2014/0300105 A1* | 10/2014 | Kalbacher | F16L 21/035 |
| | | | 285/351 |
| 2016/0273685 A1* | 9/2016 | Considine | F16L 21/035 |
| 2017/0059071 A1* | 3/2017 | Podewski | F16L 33/22 |
| 2018/0299046 A1* | 10/2018 | Sessa | F16L 21/035 |
| 2019/0371584 A1 | 12/2019 | Carney et al. | |

FOREIGN PATENT DOCUMENTS

CN 209133455 U 7/2019

OTHER PUBLICATIONS

Combined Search and Examination Report issued for GB Application No. GB2113035.6 dated May 25, 2022, 11 pages.

\* cited by examiner

*Primary Examiner* — David Bochna
(74) *Attorney, Agent, or Firm* — Thomas F. Cooney

(57) ABSTRACT

A connector for use in vacuum system is configured to fluidly connect a first opening formed in a first vacuum chamber to a second opening formed in a second vacuum chamber, the first opening of the first vacuum chamber being provided within the second vacuum chamber. The connector comprises a tube and a biasing O-ring. The tube has an outer wall to define a fluid flow path between first and second ends of the tube. Towards the first end, a sealing portion of the outer wall of the tube is provided. Towards the second end, an O-ring retaining point is provided along the tube spaced apart from the second end of the tube. The biasing O-ring is provided around and tensioned by the outer wall of the tube. The biasing O-ring is moveable along the axial direction between the O-ring retaining point and a sealing position where it seals the connector.

14 Claims, 4 Drawing Sheets

Detail A

VACUUM CHAMBER CONNECTOR

CROSS REFERENCE TO RELATED APPLICATION

This application claims, under 35 U.S.C. 119(a), the right of priority to United Kingdom patent application No. 2113035.6, which was filed on Sep. 13, 2021, the disclosure of which is incorporated herein by reference in its entirety.

FIELD OF THE DISCLOSURE

The present disclosure relates to vacuum chambers. In particular, the present disclosure relates to connectors for forming fluid connections between vacuum chambers.

BACKGROUND

Scientific measurement equipment, such as a mass spectrometry system, are often operated under vacuum pressures (i.e. less than atmospheric pressure). For a mass spectrometry system, various components of the mass spectrometry system may be operated at different pressures. In order to house the various components of the mass spectrometer system at the desired different pressures, a mass spectrometry system may comprise a plurality of vacuum chambers, wherein the vacuum chambers may be configurable to be held at different pressures.

One such example of a vacuum chamber is a fragmentation chamber. In some mass spectrometry systems, the fragmentation chamber may be housed within a larger vacuum chamber. As part of the mass spectrometry system, it may be desirable to form a fluid connection between the various vacuum chambers. For example, in some fragmentation chambers known in the art a pressure sensor may be fluidly connected to the fragmentation chamber in order to sense to the pressure of the fragmentation chamber.

Against this background, it is an object of the invention to provide a connector for forming a fluid connection between vacuum chambers.

SUMMARY

According to a first aspect of the disclosure, a connector is provided. The connector is configured to fluidly connect a first opening formed in a first vacuum chamber to a second opening formed in a second vacuum chamber, wherein the first opening of the first vacuum chamber is provided within the second vacuum chamber. The connector comprises a tube and a biasing O-ring. The tube has an outer wall extending in an axial direction to define a fluid flow path between a first end of the tube and a second end of the tube. Towards the first end of the tube, a sealing portion of the outer wall of the tube is provided, the sealing portion configured to engage with the first vacuum chamber in order to form a seal. Towards the second end of the tube, an O-ring retaining point is provided along the tube spaced apart from the second end of tube. The biasing O-ring, when not tensioned, has an internal diameter less than an end diameter at the second end of the tube. The biasing O-ring is provided around the outer wall of the tube such that the biasing O-ring is tensioned by the outer wall of the tube. The biasing O-ring is configured to be moveable along the axial direction of the tube between the O-ring retaining point and a sealing position where the biasing O-ring seals the connector between the first and second openings.

According to the first aspect, the connector enables a first vacuum chamber to be fluidly connected to an opening formed in a surrounding second vacuum chamber. Such a connector may be used, for example, to fluidly connect a fragmentation chamber to a pressure sensor, wherein the pressure sensor is provided outside the second vacuum chamber. In other embodiments, a sensor other than a pressure sensor could be provided outside the second vacuum chamber and fluidly connected in this way to the first vacuum chamber. Such other sensor could be a chemical sensor, for example.

The biasing O-ring of the connector of the first aspect allows the connector to be installed between the first and second openings by placing the connector in position and moving the biasing O-ring from the O-ring retaining point to the sealing position. In the sealing position, the biasing O-ring forms a seal between the second end of the connector and the second vacuum chamber. The biasing O-ring, due to its untensioned internal diameter being smaller than the second end of the connector also biases the sealing portion of the connector (towards the first end of the connector) against the first vacuum chamber. Accordingly, the biasing O-ring can be used to easily form a fluid connection between the first and second openings of the respective vacuum chambers.

According to this disclosure, it is understood that reference to an internal diameter of an O-ring is a reference to the internal diameter of the O-ring (e.g. the biasing O-ring) when not under any applied force (i.e. the O-ring is not tensioned).

The connector can also be removed by movement of the biasing O-ring from the sealing position to the O-ring retaining point. As such, the connector can be easily and repeatedly installed (and removed). As the seal between the second end of the connector and the second vacuum chamber is provided by the biasing O-ring, no metal-metal connections are required, thereby reducing wear of the connector. As such, the connector of the first aspect is less prone to wear (relative to connectors involving metal-metal contacts, such as screw threads).

In some embodiments, towards the second end of the tube, a sloped portion of the tube is provided in which a diameter of the outer wall varies from the end diameter at the second end of the tube to a retaining diameter at the O-ring retaining point. In some embodiments, the end diameter is less than the retaining diameter. As such, the diameter of the outer wall increases in the axial direction from the second end (having the end diameter) to the O-ring retaining point (having the retaining diameter). By providing a sloped portion towards the second end of the tube, the biasing O-ring may be more easily moved between the O-ring retaining point and the sealing position, and vice versa. Furthermore, in some instances, the gap between the first and second openings in which the connector is to be installed may be subject to a tolerance. The sloped portion provides a region of the tube where the O-ring may bias the tube in the sealing position for a range of gap sizes.

In some embodiments, the sloped portion of the outer wall of the tube is sloped with respect to the axial direction of the tube at an angle of at least 10°, 20°, 30°, or 40°. By providing a sloped portion with such an angle, the force provided by the biasing O-ring may bias the tube towards the first opening.

In some embodiments, the sloped portion of the outer wall of the tube is sloped with respect to the axial direction of the tube at an angle of no greater than 60°, 70° or 80°. By providing a sloped portion with such an angle, the biasing O-ring may be easier to move along the tube from the sealing position towards the O-ring retaining point.

In some embodiments, an angle of the sloped portion of the outer wall of the tube with respect to the axial direction may vary along the length of the sloped portion in the axial direction. In some embodiments, the variation in angle of the sloped portion lies in the ranges specified above. In some embodiments, the angle may decrease along the sloped portion in the axial direction moving from the second end of the tube towards the O-ring retaining point. When in the sealing position, the biasing force applied by the biasing O-ring to the tube depends on the angle of the sloped portion, particularly at the point that the biasing O-ring is in contact with, and the tension in the biasing O-ring. When in the sealing position, the tension in the biasing O-ring depends on the point at which the biasing O-ring engages with the sloped portion, which in turn depends on the gap between the first and second openings (which are subject to tolerances). As such, a decrease in gap size would cause the biasing O-ring to sit further towards the O-ring retaining point, thereby increasing the tension in the biasing O-ring. By providing the sloped portion with a decreasing angle, the effect of variation of the gap size between the first and second openings may be reduced or eliminated, as the increased tension in the biasing O-ring is offset by the decrease in angle, and vice versa, such that the biasing force applied in the axial direction of the tube is kept roughly the same, or at least a rate of increase in biasing force (should one arise) is reduced.

In some embodiments, the sloped portion may be provided with a first sloped section having a first angle with respect to the axial direction and a second sloped section having a second angle with respect to the axial direction. The first sloped section extends from the second end in the axial direction to the second sloped section which extends in the axial direction between the first sloped section and the O-ring retaining point. In some embodiments, the first angle is greater than the second angle. Providing a sloped portion having two sloped sections may be easier to manufacture than a sloped portion having a curved surface. For example, the first angle may be about 55° and the second angle may be about 40°.

In some embodiments, the O-ring retaining point provides a local maximum in the axial direction for the diameter of the outer wall of the tube. As such, the tube includes a ridge, or bump around its circumference at the O-ring retaining point. Said ridge enables the biasing O-ring to be retained in a position away from the second end of the tube when the connector is being installed. The ridge also helps keep the biasing O-ring on the tube when the connector is not being used.

In some embodiments, the biasing O-ring has a cross-sectional thickness that is at least equal to the distance in the axial direction between the second end of the tube and the O-ring retaining point. As such, the biasing O-ring may have a cross-sectional thickness that is at least equal to the distance in the axial direction of the sloped portion of the tube.

In some embodiments, the sealing portion towards the first end of the connector may directly contact the first vacuum chamber in order to form a seal between the connector and the first vacuum chamber. In some embodiments, the connector may further comprising a sealing O-ring provided around the outer wall of the tube, the sealing O-ring configured to engage with the sealing portion of the outer wall of the tube and the first vacuum chamber. As such, the sealing O-ring may be provided to form a seal between the connector and the first vacuum chamber. The sealing O-ring is sealed against the first vacuum chamber by the biasing force provided by the biasing O-ring acting on the tube.

In some embodiments, at the sealing portion, the diameter of the outer wall of the tube varies from a first diameter towards the second end of the tube, to a second diameter, smaller than the first diameter towards the first end of the tube. By providing a variable diameter at the sealing portion, the connector may be configured to engage with first openings of a range of different diameters.

In some embodiments, the first end of the tube is configured to be inserted into the first opening of the first vacuum chamber.

In some embodiments, the sealing portion of the outer wall is provided at a point along the axial direction of the tube spaced apart from the first end by a first end distance of at least a diameter of the outer wall of the tube at the first end of the tube. Accordingly, a section of the tube is provided at the first end which is configured to extend into the first opening of the first vacuum chamber. Such a section helps to locate the connector between the first and second openings when installing the connector.

In some embodiments, the first end distance is no greater than three times the diameter of the outer wall of the tube at the first end of the tube. Preferably, the first end distance is about two times the diameter of the outer wall of the tube at the first end of the tube.

According to a second aspect of the disclosure, a vacuum system is provided. The vacuum system comprises: a first vacuum chamber having a first opening formed therein, a second vacuum chamber having a second opening formed therein, wherein the first vacuum chamber is provided within the second vacuum chamber, and a connector configurable to fluidly connect the first opening to the second opening. The connector comprises a tube and a biasing O-ring. The tube has an outer wall extending in an axial direction to define a fluid flow path between a first end of the tube and a second end of the tube, the second end of the tube having an end diameter. Towards the first end of the tube, a sealing portion of the outer wall of the tube is provided, the sealing portion configured to engage with the first vacuum chamber in order to form a seal. Towards the second end of the tube, an O-ring retaining point is provided along the tube spaced apart from the second end of tube. The biasing O-ring, when not tensioned, has an internal diameter less than the (outer) end diameter of the tube. The biasing O-ring is provided around the outer wall of the tube such that the biasing O-ring is tensioned by the outer wall of the tube. The biasing O-ring is configured to be moveable along the axial direction of the tube between the O-ring retaining point and a sealing position where the biasing O-ring seals the connector between the first and second openings.

As such, the vacuum system of the second aspect has a first opening in a first vacuum chamber that is fluidly connected to a second opening in the second vacuum chamber using the connector of the first aspect of the disclosure. Accordingly, the vacuum system of the second aspect may incorporate all the optional features of the first aspect described above and the associated advantages.

In some embodiments, towards the second end of the tube, a sloped portion of the tube is provided in which a diameter of the outer wall varies from the end diameter at the second end of the tube to a retaining diameter at the O-ring retaining point.

In some embodiments, a cross-sectional thickness of the biasing O-ring is greater than the difference between:

the distance in the axial direction between the first and second openings, and the distance in the axial direction between the sealing portion and the second end of the tube. Furthermore, in some embodiments, the cross-sectional thickness of the biasing O-ring is less than two times this difference, for example about 1.5 times this difference. The cross-sectional thickness of the biasing O-ring may be 1.1 to 1.9 times this difference, or 1.2 to 1.8 times this difference, or 1.3 to 1.7 times this difference, or 1.4 to 1.6 times this difference. As such, the cross-sectional thickness of the biasing O-ring may be sized based on the gap between the second end of the tube and the second opening when the tube is in the sealing position.

In some embodiments, a difference in pressure between a pressure of the first vacuum chamber and a pressure in the second vacuum chamber is no greater than 1000 Pa.

In some embodiments, the vacuum system further comprises a pressure sensor fluidly connected to the second opening of the second vacuum chamber.

In some embodiments, the first vacuum chamber is a fragmentation chamber for fragmenting molecular ions. In some embodiments, the vacuum system is part of a mass spectrometer. As such, the mass spectrometer may comprise a fragmentation chamber (first vacuum chamber) housed within a second vacuum chamber. The connector may then be connected between a first opening of the fragmentation chamber and a second opening formed in the second vacuum chamber. Thus, according to a third aspect, a mass spectrometer comprising the vacuum system is provided.

According to a fourth aspect, a kit of parts for a connector configured to fluidly connect a first opening formed in a first vacuum chamber to a second opening formed in a second vacuum chamber, wherein the first opening of the first vacuum chamber is provided within the second vacuum chamber is provided. The kit of parts comprises a tube and a biasing O-ring. The tube has an outer wall extending in an axial direction to define a fluid flow path between a first end of the tube and a second end of the tube. Towards the first end of the tube, a first sealing portion of the outer wall of the tube is provided, the first sealing portion configured to engage with the first vacuum chamber in order to form a seal. Towards the second end of the tube, an O-ring retaining point is provided along the tube spaced apart from the second end of tube. The biasing O-ring has an internal diameter less than the end diameter at the second end of the tube. The biasing O-ring is configured to be provided around the outer wall of the tube such that the biasing O-ring is tensioned by the outer wall of the tube. The biasing O-ring is configured to be moveable along the axial direction of the tube between the O-ring retaining point and a sealing position on the sloped portion of the outer wall where the biasing O-ring seals the connector between the first and second openings.

As such, the kit of parts of the third aspect may be used to provide the connector of the first aspect. Accordingly, the kit of parts of the third aspect may further include any features corresponding to the optional features of the first aspect described above.

BRIEF DESCRIPTION OF THE DRAWINGS

A specific embodiment of the disclosure will now be described, by way of example only, with reference to the accompanying drawings in which.

DETAILED DESCRIPTION

Figure 1:
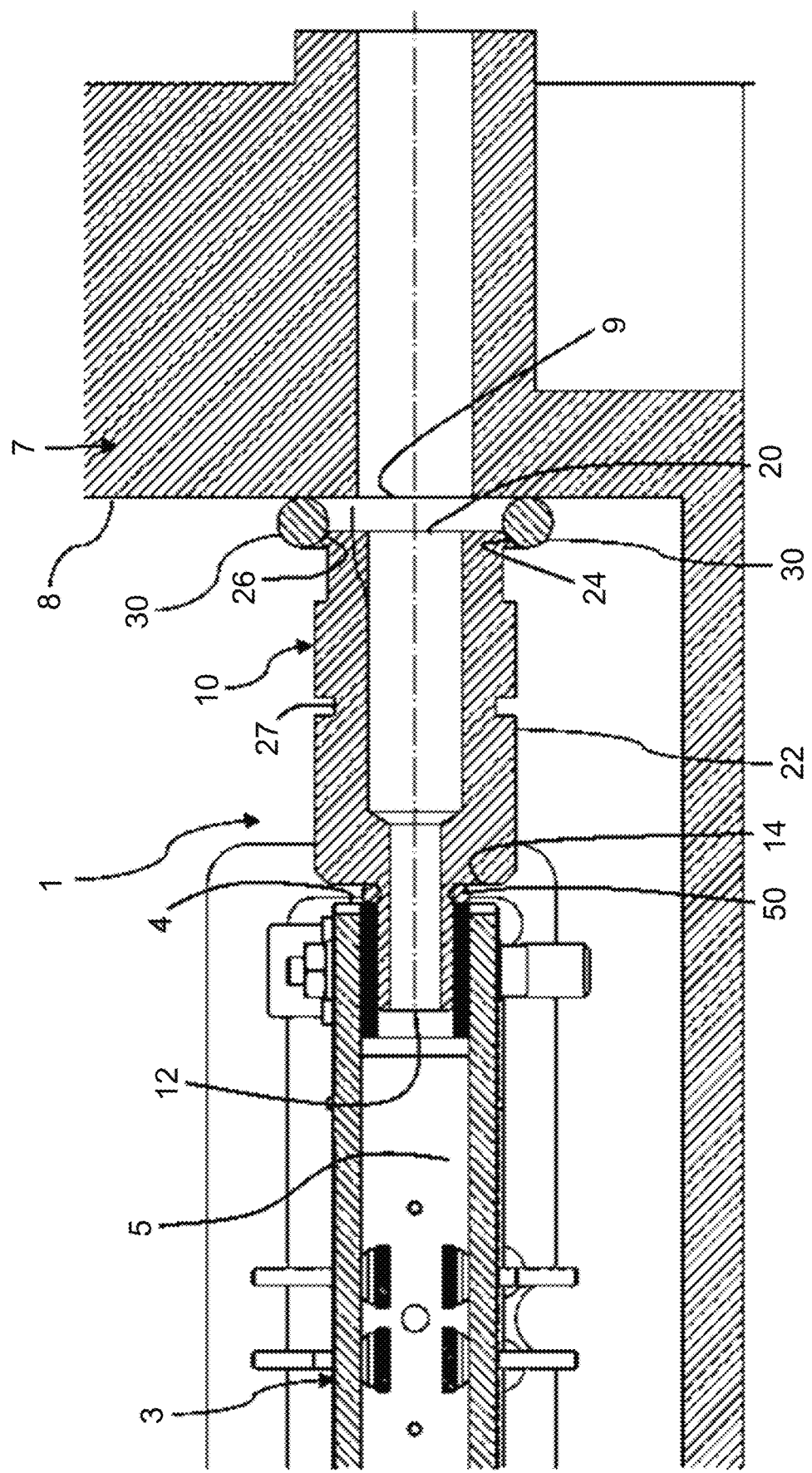
FIG. 1 shows a schematic diagram of a connector connected between a fragmentation chamber and a vacuum chamber according to a first embodiment of the disclosure.

According to a first embodiment, a connector 1 is provided. The connector is connected between a first vacuum chamber 3 and a second vacuum chamber 7. The first and second vacuum chambers 3, 7 form part of a vacuum system (not shown). In some embodiments, the vacuum system may form part of a mass spectrometry system (not shown) configured to analyse the mass of ions. An example of such a vacuum system is shown in FIG. 1.

The first vacuum chamber 3 comprises a first wall 4 which defines a first opening 5 therein. The first opening 5 is provided through the thickness of the first wall 4 such that the internal volume of the first vacuum chamber can fluidly communicate with the external surroundings of the first vacuum chamber via the first opening 5.

In some embodiments, the first opening 5 of the first vacuum chamber 3 has a diameter of about 5 mm. Such a diameter is suitable for sensing a pressure of the first vacuum chamber 3 through the first opening 5. Alternatively, the first opening 5 may be used to provide a gas inlet, or gas outlet to the first vacuum chamber 3.

According to the first embodiment, the first vacuum chamber 3 may comprise a fragmentation chamber. The fragmentation chamber may be configured to fragment ions as part of a mass spectrometry system. For example, the fragmentation chamber may be configured to perform collision induced dissociation (CID), surface induced dissociation, laser induced dissociation, electron capture dissociation, electron transfer dissociation, photodissociation or any other form of ion fragmentation known to the skilled person. For example, the fragmentation chamber may comprise a Higher energy collision dissociation (HCD) fragmentation chamber configured to perform CID.

In some embodiments where the first vacuum chamber 3 is a fragmentation chamber, for example a HCD fragmentation chamber, the first vacuum chamber 3 may be configurable to be held at a pressure of about 1 Pa.

The second vacuum chamber 7 comprises a second wall 8 which defines a second opening 9 therein. The second opening 9 may be provided through the thickness of the second opening 9 such that the internal volume of the second vacuum chamber 7 can fluidly communicate with the external surroundings of the second vacuum chamber 7.

The second vacuum chamber 7 comprises a vacuum chamber configured to house the first vacuum chamber 3. As such, the first vacuum chamber 3 is provided within the second vacuum chamber 7 (i.e., the first vacuum chamber 3 is provided within the internal volume defined by the second vacuum chamber 7). Additionally, the second vacuum chamber 7 may comprise further components. For example, where the connector is provided as part of a mass spectrometry system, other parts of the mass spectrometry system (not shown) may be provided within the second vacuum chamber 7. In other embodiments, the first vacuum chamber 3 may not be provided within the second vacuum chamber 7 but adjacent to the second vacuum chamber so that the first and second chambers are arranged side by side, i.e., in series.

In some embodiments where the second vacuum chamber is a part of a mass spectrometry system, the second vacuum chamber 7 may be configurable to be held at a pressure of about 3 mPa. In some embodiments, it is preferable that the pressure difference between the first and second vacuum chambers is no greater than 1000 Pa.

Figure 2:
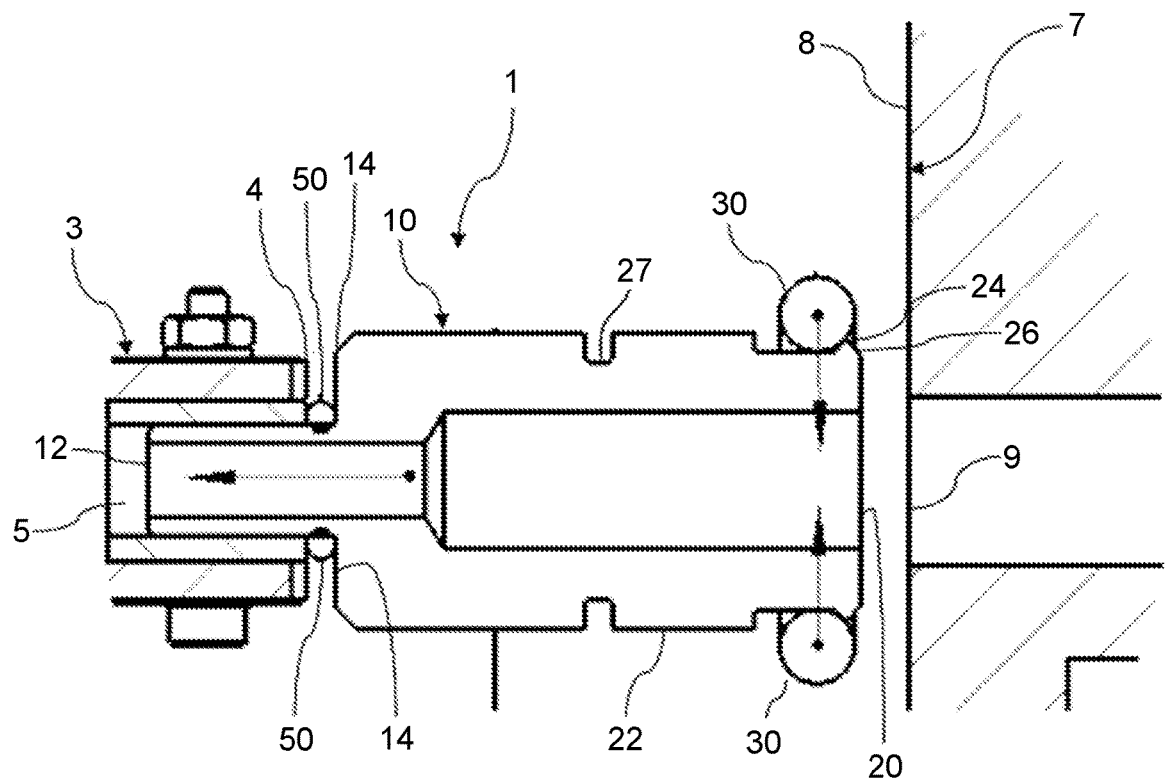
FIG. 2 shows a schematic diagram of a connector according to a first embodiment of the disclosure.

FIG. 2 shows a schematic diagram of the connector 1 located in an installation position to fluidly connect the first opening 4 to the second opening 9. As shown in FIG. 2, the first and second openings 5, 9 are concentric (i.e., aligned along an axial direction). The first wall 4 of the first vacuum chamber 3 is aligned generally parallel to the second wall 8 of the second vacuum chamber in order make it easier to install the connector 1. The first and second walls 4, 8 are spaced apart by a first distance. In some embodiments, the first distance may be at least at least as a large as the outer diameter of the tube 10 at the second end 20. In some embodiments, the first distance may be no greater than three times the outer diameter of the tube 10 at the second end 20. In the embodiment of FIG. 2, the outer diameter of the tube 10 at the second end 20 is about 15 mm and the first distance is 30.5 mm, which is about twice the outer diameter.

As shown in FIG. 2 the connector 1 comprises a tube 10, a biasing O-ring 30 and a sealing O-ring 50.

The tube 10 comprises a first end 12 and a second end 20. The first end 12 is configured to engage with the first opening 5 of the first vacuum chamber 3. The second end 20 is configured to engage with the second opening 9 of the second vacuum chamber 7. The tube 10 defines a fluid connection along an axial direction of the tube 10 between the first end 12 and the second end 20.

As shown in FIG. 2, the tube 10 is a generally rotationally symmetric tube (i.e., generally cylindrical). The tube 10 has an internal diameter that varies along the length (axial direction) of the tube. The tube 10 also has an external diameter defined by an outer wall 22 of the tube. The external diameter of the tube 10 also varies along the length (axial direction) of the tube 10 between the first and second ends 12, 20. The internal and external diameters of the tube may vary along the length of the tube 10 to accommodate any difference between the diameter of the first opening 5 and the second opening 9.

In the embodiment of FIG. 2, the internal diameter of the tube 10 at the first end 12 is about 3.8 mm. In the embodiment of FIG. 2, the internal diameter of the tube 10 at the second end 20 is about 7 mm.

As shown in FIG. 2, the first end 12 of the tube 10 is configured to be inserted into the first opening 5 of the first vacuum chamber 3. A sealing portion 14 of the outer wall 22 of the tube is provided at a point along the length of the tube (spaced apart from the first end 12). The sealing portion 14 is configured to engage with the first vacuum chamber 3 in order to form a seal. In the embodiment of FIG. 2, the sealing portion 14 is configured to seal a sealing O-ring 50 against the first wall 4 of the first vacuum chamber 3 surrounding the first opening 5. In other embodiments, the sealing portion 14 of the outer wall 22 may directly contact the first vacuum chamber 3 (e.g., the first wall 4) in order to form a seal between the connector 1 and the first vacuum chamber 3 about the first opening 5.

In the embodiment of FIG. 2, the sealing portion 14 is spaced apart from the first end 12 by a first end distance of at least a diameter of the outer wall of the tube at the first end 12 of the tube. As such, a section of the tube is provided at the first end which is configured to extend into the first opening 5 of the first vacuum chamber 3. Such a section helps to locate the connector 1 between the first and second openings 5, 9 when installing the connector 1.

In the embodiment of FIG. 2, the first end distance is no greater than three times the diameter of the outer wall of the tube at the first end of the tube. Preferably, the first end distance is about two times the diameter of the outer wall of the tube at the first end of the tube. For example, in the embodiment of FIG. 2, the first end distance is about 8 mm.

As shown in FIG. 2, the sealing O-ring 50 may be provided around the external diameter of the tube 10 at the sealing portion 14. In the embodiment of FIG. 2, the sealing portion 14 comprises a locating groove 27. The locating groove is provided around the outer wall 22 of the tube 10. The locating groove 27 is configured to locate the sealing O-ring 50 at the sealing portion 14. Accordingly, it may be easier to install the connector 1 when the sealing O-ring 50 is located in position by the locating groove 27 of the sealing portion 14.

The sealing O-ring 50 is provided around the tube 10. The sealing O-ring 50 may have an internal diameter that is less than the smallest external diameter of the tube 10 at the sealing portion 14 in order to help locate the sealing O-ring 50 on the tube 10. As such, the sealing O-ring 50 may be tensioned by the outer wall 22 of the tube 10 in order to locate the sealing O-ring 50 around the outer wall of the tube 10 at the sealing portion 14.

The second end 20 of the tube 10 is configured to be sealed against the second vacuum chamber 7. An O-ring retaining point 24 is provided towards the second end of the tube 20. The O-ring retaining point 24 is spaced apart in the axial direction from the second end of the tube 20.

In some embodiments, for example as shown in FIG. 2, between the O-ring retaining point 24 and the second end 20, a sloped portion 26 of the outer wall of the tube is provided. In the sloped portion of the tube 26, a diameter of the outer wall 22 varies from an end diameter at the second end 20 of the tube 10 to a retaining diameter at the O-ring retaining point. As shown in FIG. 2, the diameter of the outer wall 22 of the tube (external diameter of the tube) varies from the end diameter to the retaining diameter.

In some embodiments, the sloped portion 26 of the outer wall of the tube is sloped with respect to the axial direction of the tube at an angle of at least 20°. By providing the sloped portion 26 with such an angle, the biasing O-ring 30 may be more easily secured in the sealing position.

In some embodiments, the sloped portion 26 of the outer wall of the tube is sloped with respect to the axial direction of the tube at an angle of no greater than 80°. By providing the sloped portion 26 with such an angle, the biasing O-ring 30 may be easier to remove from the sealing position.

The end diameter of the outer wall 22 at the second end 20 of the tube 10 will depend on the size of the second opening 9 to be sealed by the connector 1. As shown in FIG. 2, the end diameter of the tube 10 is greater than the diameter of the second opening 9. In the embodiment of FIG. 2, where the second opening 9 has a diameter of about 7 mm, the end diameter of the outer wall 22 at the second end 20 of the tube 10 has a diameter of about 15 mm.

As further shown in FIG. 2, the O-ring retaining point 24 provides a local maximum in the axial direction for the diameter of the outer wall 22 of the tube 10. As such, moving beyond the O-ring retaining point 24 in the axial direction (towards the first end), the diameter of the outer wall 22 of the tube 10 decreases from the diameter at the O-ring retaining point 24. As such, the O-ring retaining point 24 provides a ridge, or bump, around the tube 10 to help locate the biasing O-ring 30 away from the second end 20 when the biasing O-ring 30 is not being used to seal the connector 1.

The biasing O-ring 30 is used to seal the second end 20 of the tube 10 to the second vacuum chamber 7. The biasing O-ring 30 also provides a biasing force to seal the first end 12 of the tube 10 against the first vacuum chamber 3. In order to provide the biasing force, the biasing O-ring 30 has an internal diameter less than the end diameter of the outer wall 22 at the second end of the tube 20.

In order to form the seal between the tube 10 and the second vacuum chamber 7, the biasing O-ring 30 is also sized to have a cross-sectional thickness greater than the gap formed between the second end 20 of the tube 10 and the second wall 8 when the tube 10 is in the sealing position (see FIG. 2). As such, the cross-sectional thickness of the biasing O-ring 30 depends on the exact configuration of the connector. That is to say, the cross-sectional thickness of the biasing O-ring 30 may be selected to account for whether a sealing O-ring 50 is provided and also the difference between: the distance in the axial direction between the first and second openings (X), and the distance in the axial direction between the sealing portion and the second end 20 of the tube (Y). For example, in the embodiment of FIGS. 1 and 2, the gap (Z=X−Y) formed between the second end 20 and the second wall 8 is about 1 mm. Accordingly, the biasing O-ring 50 has a cross sectional thickness of about 1.5 mm.

In some embodiments where a sloped portion 26 of the tube 10 is provided, it is preferable that the cross-sectional thickness of the biasing O-ring 30 is sized to fit in the gap between the sloped portion of the tube 26 and the second wall 8. As such, in some embodiments, the biasing O-ring 30 may have a cross-sectional thickness no greater than two times the distance (in the axial direction) between the O-ring retaining point 24 and the second vacuum chamber 7 when the connector is in the sealing position.

Figure 3:
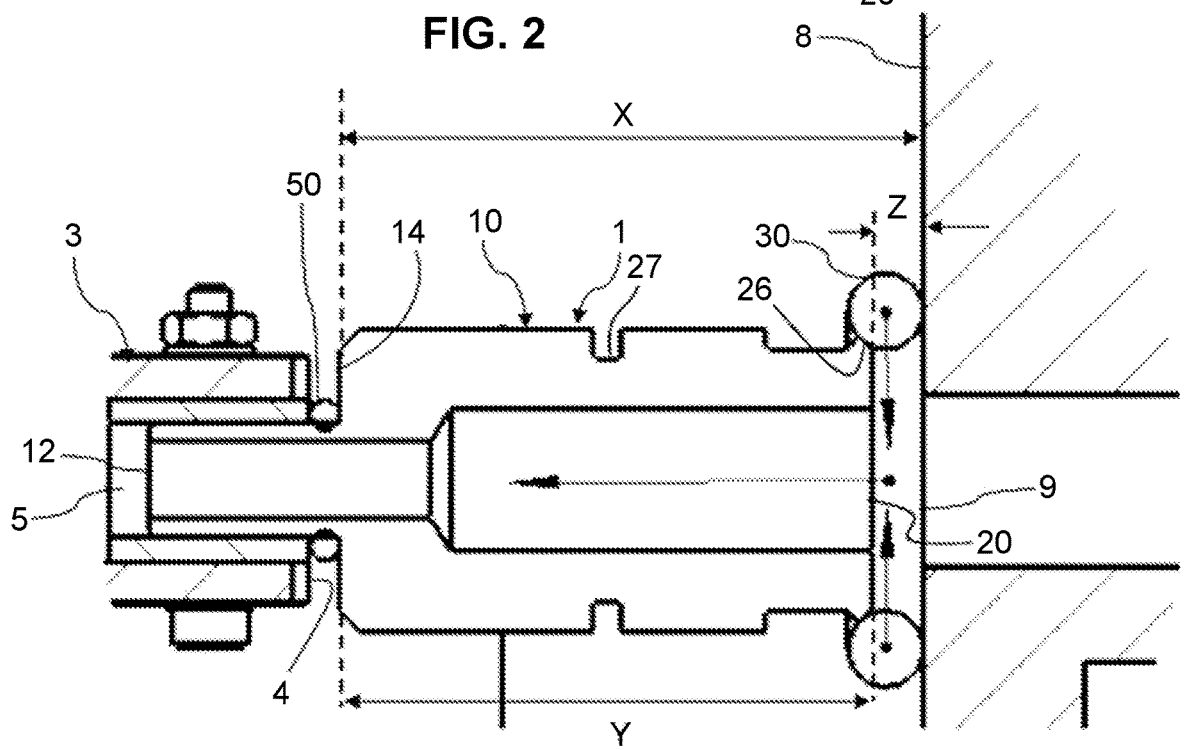
FIG. 3 shows the connector of the first embodiment installed between a first vacuum chamber and a second vacuum chamber.

FIG. 3 shows a schematic diagram of the connector 1 connected between the first and second vacuum chambers 3, 7. In FIG. 3, the biasing O-ring 30 has moved from the position shown in FIG. 2 (an installation position) to a sealing position. The biasing O-ring 30 can be moved from the installation position to the sealing position by a user rolling the biasing O-ring 30 over the ridge provided by the O-ring retaining point 24, such that the internal sides of the biasing O-ring 30 contact the sloped portion of the tube 26. As the biasing O-ring 30 has an internal diameter that is smaller than the end diameter of the second end of the tube 20, the biasing O-ring 30 is tensioned by the outer wall of the tube. Consequently, the tension of the biasing O-ring 30 allows the biasing O-ring to seal the gap between the second end of the tube 20 and the second vacuum chamber 7. The tension of the biasing O-ring 30 also biases the tube 10 in the axial direction towards the first vacuum chamber 3 such that the sealing portion 14 of the tube 10 biases the sealing O-ring 50 against the first vacuum chamber 3.

Figure 4:
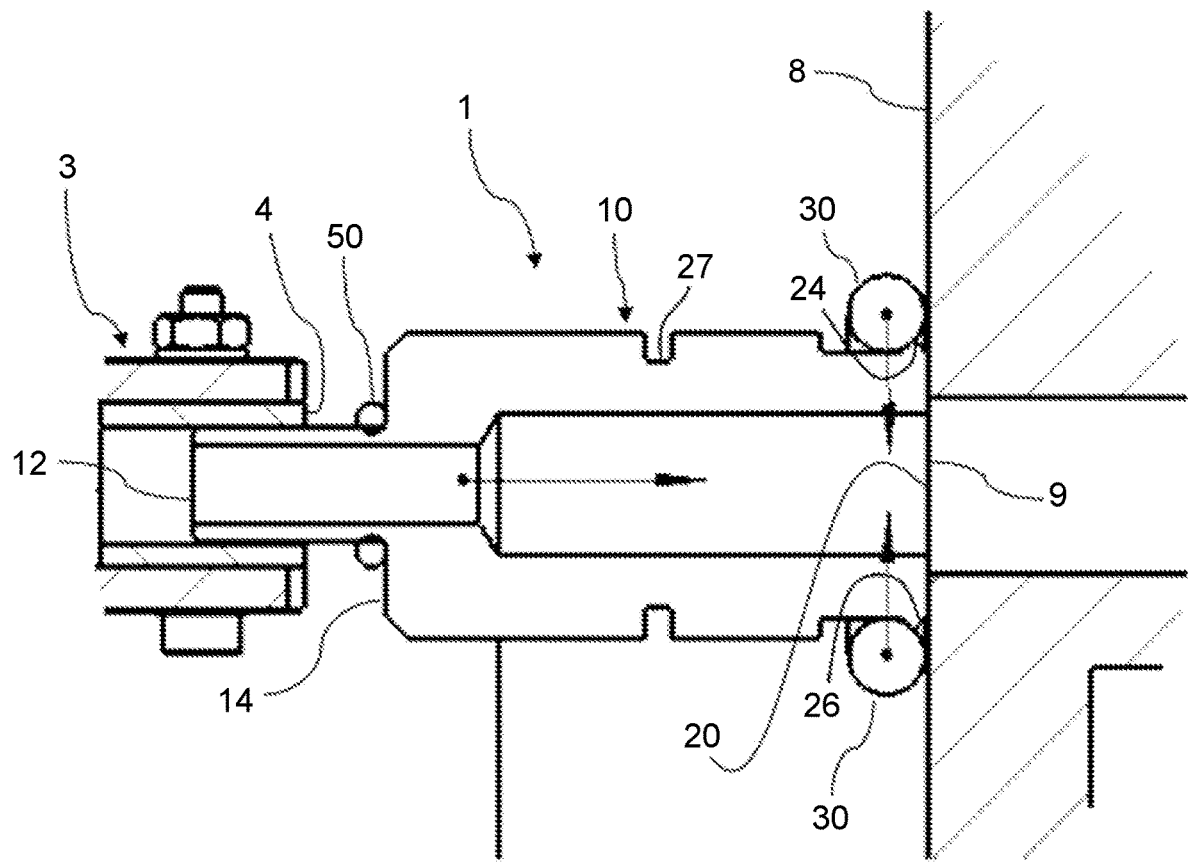
FIG. 4 shows the connector of the first embodiment being removed from between the first and second vacuum chambers.

FIG. 4 shows a further schematic diagram of the connector 1 being removed from between the first and second vacuum chambers 3, 7. As shown in FIG. 3, the connector 1 can be removed from the sealing position by moving the tube 10 in the axial direction towards the second opening 9 and thereby rolling the biasing O-ring 30 over the O-ring retaining point 24. As such, the connector 1 can be easily installed and removed from between the first and second vacuum chambers 3, 7. For better handing and application of force for removal, a groove 27 can be provided in the outer wall 22 of the tube to allow a tool or other aid to engage the tube and exert force. For example, a washer (not shown) or other tool may be used to engage with the groove 27. Alternatively, the tube 10 may be provided with some form of handle about a mid-point of the tube to assist a user with handling the tube 10 to install or remove the tube 10.

The biasing O-ring 30 and the sealing O-ring 50 may be provided using any suitable O-ring known to the skilled person, for example a fluorocarbon O-ring. To prevent sticking, the O-ring(s) and/or other contacting parts can be coated with an anti-adhesive material, compatible with the vacuum conditions used. For example, in the embodiment of FIGS. 1-4, one or more of the biasing O-ring 30 and the sealing O-ring 50 may comprise a friction reducing coating. Where the biasing O-ring 30 is provided with a friction reducing coating, the force required to remove the connector 1 from the sealing position may be reduced, as the biasing O-ring 30 may be easier to roll back over the O-ring retaining point 24. For example, in the embodiments of FIGS. 1-4 the biasing O-ring 30 and/or the sealing O-ring 50 may be coated with a friction reducing coating comprising Polytetrafluoroethylene (PTFE).

The biasing O-ring 30 provides the tension to seal the tube 10 between the first and second openings 5, 9. The hardness of the biasing O-ring 30 may be selected, in combination with the internal diameter of the biasing O-ring 30 in order to provide the desired tension in the biasing O-ring 30 when it is located in the sealing position. In the embodiments of FIGS. 1-4 a biasing O-ring 30 with a hardness of about 75 Shore A is used. Of course, in other embodiments, O-rings having a different hardness may be used.

It will be appreciated that the dimensions provided in the above embodiment are one possible example for connector 1 according to this disclosure. The skilled person will appreciate that the dimensions of various parts of the connector 1 may be selected based on the dimensions of various parts of the vacuum system to be connected. In some embodiments, it will be appreciated that while the connector may be designed to connect first and second openings 5, 9 across a gap of a nominal size, the dimensional tolerances of various parts of the vacuum system may result in the gap to be connected varying (within a certain tolerance) from the nominal size. According to some embodiments, the connector 1 may accommodate for such tolerances.

Figure 5:
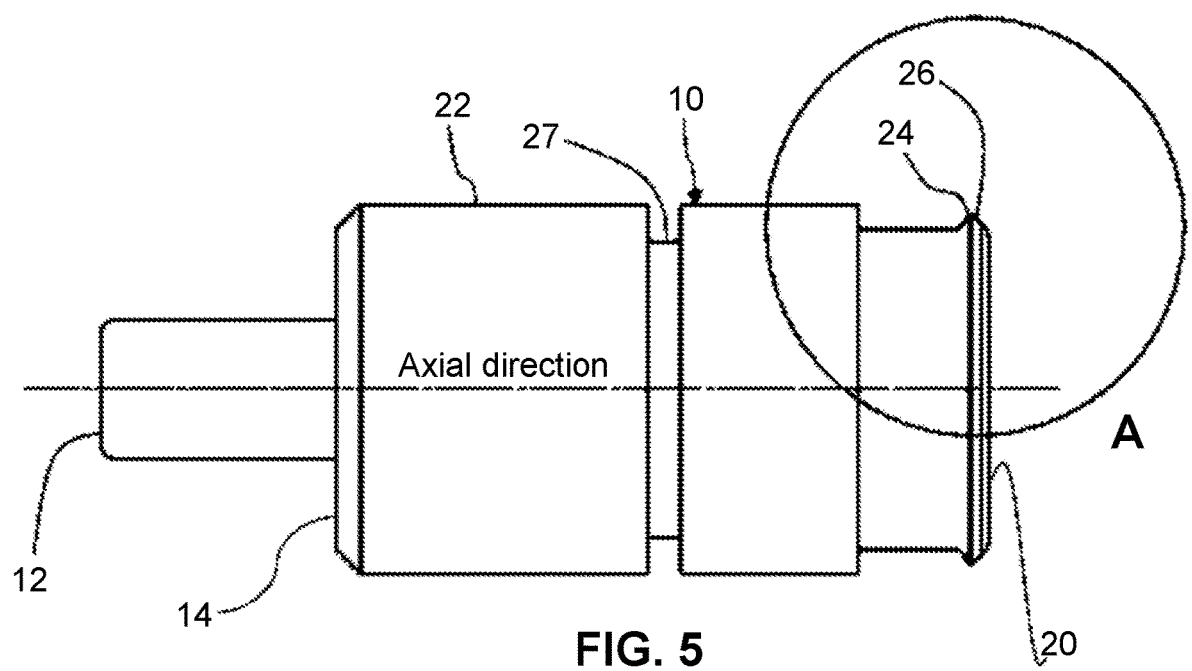
FIG. 5 shows a diagram of the tube of the connector according to the first embodiment of the disclosure.
Figure 6:
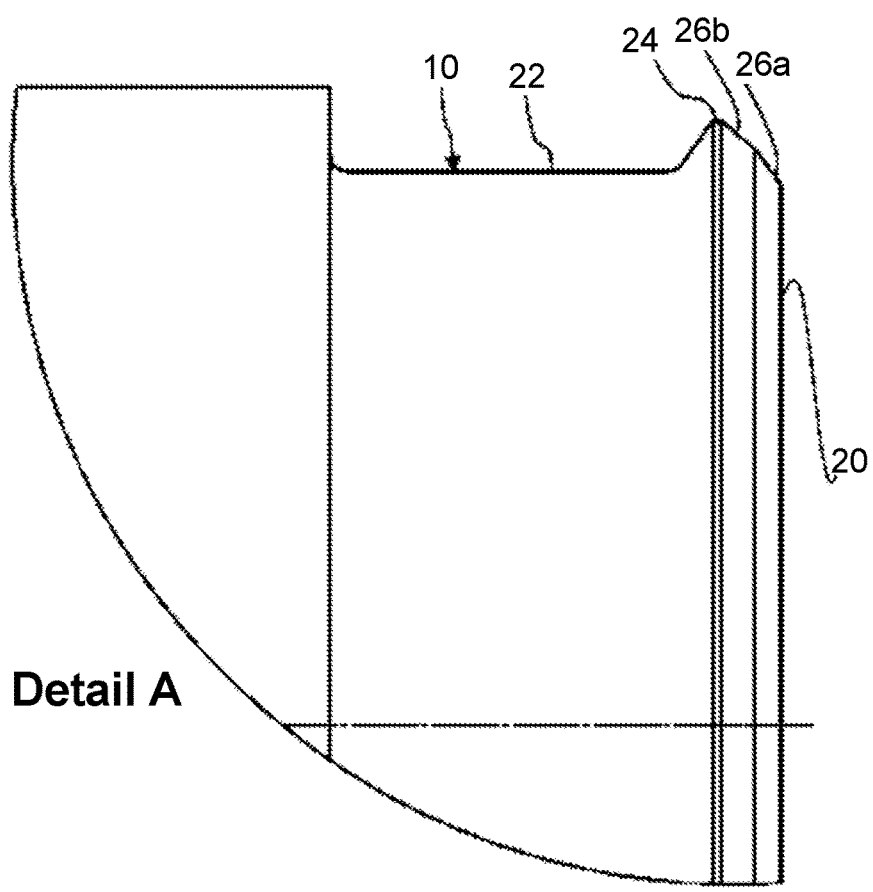
FIG. 6 shows a detailed view 'A' of the tube shown in FIG. 5.

FIG. 5 shows a further side view of the tube 10 according to an embodiment of the disclosure. The tube 10 of FIG. 5 has a sloped portion 26 wherein an angle of the sloped portion 26 (with respect to the axial direction of the tube 10) varies along the length of the sloped portion 26 in the axial direction. In FIG. 5, the angle decreases along the sloped portion in the axial direction moving from the second end 20 of the tube 10 towards the O-ring retaining point 24.

It will be appreciated that when the connector 1 is in the sealing position, the biasing force applied by the biasing O-ring 30 to the tube depends on the angle of the sloped portion and the tension in the biasing O-ring 30. When in the sealing position, the tension in the biasing O-ring depends on the point at which the biasing O-ring engages with the sloped portion, which in turn depends on the gap between the first and second openings 5, 9 (which are subject to tolerances). As such, a decrease in gap size would cause the biasing O-ring 30 to sit further towards the O-ring retaining point 24 when in the sealing position, thereby increasing the tension in the biasing O-ring 30. The increased tension in the biasing O-ring 30 is then offset by the decrease in angle such that the biasing force applied in the axial direction of the tube is kept roughly the same, or at least a rate of increase in biasing force (should one arise) is reduced. Accordingly, by providing the sloped portion 26 with a decreasing angle towards the O-ring retaining point 24, the effect of variation of the gap size between the first and second openings 5, 9 may be reduced or eliminated.

In the embodiment of FIG. 5, the sloped portion 26 is provided with a first sloped section 24a having a first angle with respect to the axial direction and a second sloped section 26b having a second angle with respect to the axial direction. The first sloped section 26a extends from the second end 20 in the axial direction to the second sloped section 26b. The second sloped section 26b extends in the axial direction between the first sloped section 26a and the O-ring retaining point 24. As shown in FIG. 5, the first angle is greater than the second angle. In FIG. 5, the first angle is about 55° and the second angle is about 40°. The embodiment of FIG. 5 is provided with a sloped portion 26 having two sloped sections 26a, 26b to simplify the manufacture of the tube 10. In other embodiments, the sloped portion 24 may be provided with three or more sloped sections of different angles, or may be provided with a continuously varying angle along the axial direction (i.e., the sloped portion follows a curve in the axial direction).

Accordingly, the connector 1 can be provided to fluidly connect a first opening 5 of a first vacuum chamber 3 to a second opening 9 of a second vacuum chamber. The second opening 9 can be fluidly connected to, for example, a pressure sensor mounted on an external portion of the second vacuum chamber 7. As such, the pressure sensor can be fluidly connected to the first vacuum chamber 3 for sensing the pressure of the first vacuum chamber 3.

What is claimed is:

1. A connector configured to fluidly connect a first opening formed in a first vacuum chamber to a second opening formed in a second vacuum chamber, wherein the first opening of the first vacuum chamber is provided within the second vacuum chamber, the connector comprising;
    a tube having an outer wall extending in an axial direction to define a fluid flow path between a first end of the tube and a second end of the tube, wherein
        towards the first end of the tube, a sealing portion of the outer wall of the tube is provided, the sealing portion configured to engage with the first vacuum chamber in order to form a seal, and
        towards the second end of the tube, an O-ring retaining point is provided along the tube spaced apart from the second end of tube; and
    a biasing O-ring having an internal diameter less than an end diameter at the second end of the tube, the biasing O-ring provided around the outer wall of the tube such that the biasing O-ring is tensioned by the outer wall of the tube, wherein the biasing O-ring is configured to be moveable along the axial direction of the tube between the O-ring retaining point and a sealing position where the biasing O-ring seals the connector between the first and second openings,
    wherein, towards the second end of the tube, a sloped portion of the tube is provided in which a diameter of the outer wall varies from the end diameter at the second end of the tube to a retaining diameter at the O-ring retaining point, and
    wherein the biasing O-ring has a cross-sectional thickness that is at least equal to the distance in the axial direction between the second end of the tube and the O-ring retaining point.

2. A connector according to claim 1, wherein
the sloped portion of the outer wall of the tube is sloped with respect to the axial direction of the tube at an angle of at least ten degrees and no more than 80 degrees.

3. A connector according to claim 1, wherein
an angle of the sloped portion of the outer wall of the tube with respect to the axial direction varies along the length of the sloped portion in the axial direction.

4. A connector according to claim 3, wherein
the angle of the sloped portion with respect to the axial direction decreases along the sloped portion in the axial direction moving from the second end of the tube towards the O-ring retaining point.

5. A connector according to claim 1, wherein
the O-ring retaining point provides a local maximum in the axial direction for the diameter of the outer wall of the tube.

6. A connector according to claim 1, further comprising
a sealing O-ring provided around the outer wall of the tube, the sealing O-ring configured to engage with the sealing portion of the outer wall of the tube and the first vacuum chamber.

7. A connector according to claim 1, wherein
the first end of the tube is configured to be inserted into the first opening of the first vacuum chamber.

8. A connector according to claim 7, wherein
the sealing portion of the outer wall is spaced apart from the first end by a first end distance of at least a diameter of the outer wall of the tube at the first end of the tube.

9. A vacuum system comprising:
    a first vacuum chamber having a first opening formed therein;
    a second vacuum chamber having a second opening formed therein, wherein the first vacuum chamber is provided within the second vacuum chamber; and
    a connector configurable to fluidly connect the first opening to the second opening, the connector comprising:
        a tube having an outer wall extending in an axial direction to define a fluid flow path between a first end of the tube and a second end of the tube, the second end of the tube having an end diameter, wherein
            towards the first end of the tube, a sealing portion of the outer wall of the tube is provided, the sealing portion configured to engage with the first vacuum chamber in order to form a seal, and
            towards the second end of the tube, an O-ring retaining point is provided along the tube spaced apart from the second end of tube; and
        a biasing O-ring having an internal diameter less than the end diameter of the tube, the biasing O-ring provided around the outer wall of the tube such that the biasing O-ring is tensioned by the outer wall of the tube, wherein the biasing O-ring is configured to be moveable along the axial direction of the tube between the O-ring retaining point and a sealing position where the biasing O-ring seals the connector between the first and second openings,
        wherein a cross-sectional thickness of the biasing O-ring is greater than the difference between:
            the distance in the axial direction between the first and second openings; and the distance in the axial direction between the sealing portion and the second end of the tube.

10. A vacuum system according to claim 9, wherein towards the second end of the tube, a sloped portion of the tube is provided in which a diameter of the outer wall varies from the end diameter at the second end of the tube to a retaining diameter at the O-ring retaining point.

11. A vacuum system according to claim 9, wherein a difference in pressure between a pressure of the first vacuum chamber and a pressure in the second vacuum chamber is no greater than 1000 Pa.

12. A vacuum system according to claim 9, further comprising
a pressure sensor fluidly connected to the second opening of the second vacuum chamber.

13. A vacuum system according to claim 9, wherein the first vacuum chamber is a fragmentation chamber.

14. A mass spectrometer comprising the vacuum system according to claim 9.

* * * * *

UNITED STATES PATENT AND TRADEMARK OFFICE
CERTIFICATE OF CORRECTION

PATENT NO. : 12,025,246 B2
APPLICATION NO. : 17/931726
DATED : July 2, 2024
INVENTOR(S) : Aivaras Venckus It is certified that error appears in the above-identified patent and that said Letters Patent is hereby corrected as shown below:

On the Title Page

In Column 1, item (30), under Foreign Application Priority Data, Line 1, delete "2113035" and insert -- 2113035.6 --, therefor.

In the Claims

In Column 11, Claim 1, Line 43, delete "comprising;" and insert -- comprising: --, therefor.

In Column 12, Claim 6, Line 23, delete "comprising" and insert -- comprising: --, therefor.

In Column 13, Claim 12, Line 14, delete "comprising" and insert -- comprising: --, therefor.

Signed and Sealed this
Thirteenth Day of August, 2024

Katherine Kelly Vidal
*Director of the United States Patent and Trademark Office*